(12) United States Patent
Riehl et al.

(10) Patent No.: US 11,680,827 B2
(45) Date of Patent: Jun. 20, 2023

(54) POSITION SENSOR, MANUFACTURING METHOD, AND METHOD FOR DETERMINING A POSITION OF A LINEAR ACTUATOR

(71) Applicant: Ewellix AB, Goeteborg (SE)

(72) Inventors: Christoph Riehl, Liestal (CH); Urs Kunz, Liestal (CH)

(73) Assignee: Ewellix AB, Goeteborg (DE)

( * ) Notice: Subject to any disclaimer, the term of this patent is extended or adjusted under 35 U.S.C. 154(b) by 56 days.

(21) Appl. No.: 17/405,232

(22) Filed: Aug. 18, 2021

(65) Prior Publication Data

US 2022/0065666 A1 Mar. 3, 2022

(30) Foreign Application Priority Data

Aug. 26, 2020 (DE) .......................... 102020122368.4

(51) Int. Cl.
  *G01D 5/241* (2006.01)
  *H02K 11/21* (2016.01)
  *H02K 7/06* (2006.01)

(52) U.S. Cl.
  CPC ............ *G01D 5/2412* (2013.01); *H02K 7/06* (2013.01); *H02K 11/21* (2016.01)

(58) Field of Classification Search
  CPC ........ G01D 5/24; G01D 5/2403; G01D 5/241; G01D 5/2412; G01D 5/2415; G01D 2205/22; H02K 7/06; H02K 11/21; H02K 29/06
  See application file for complete search history.

(56) References Cited

U.S. PATENT DOCUMENTS

| | | | | | |
|---|---|---|---|---|---|
| 4,961,055 A | * | 10/1990 | Habib | .................. | G01D 5/2412 340/870.37 |
| 5,525,955 A | * | 6/1996 | Tonogai | ................. | G01D 5/165 338/92 |
| 5,872,408 A | * | 2/1999 | Rakov | .................. | G01D 5/2412 310/68 B |

(Continued)

FOREIGN PATENT DOCUMENTS

| | | |
|---|---|---|
| DE | 102015121047 A1 | 6/2017 |
| DE | 102018124177 A1 | 4/2020 |

OTHER PUBLICATIONS

Netzer, Yishay, Capacitive Displacement Encoder, machine translation and WO 02/31432 (Year: 2002).*

(Continued)

*Primary Examiner* — Steven L Yeninas
(74) *Attorney, Agent, or Firm* — Laurence A. Greenberg; Werner H. Stemer; Ralph E. Locher

(57) ABSTRACT

A position sensor for a linear actuator, a production method for a position sensor, a linear actuator with a position sensor, and a method for determining a position of a linear actuator. The position sensor has a capacitor arrangement and a data processing device. The capacitor arrangement has a first capacitor element and a second capacitor element arranged to be movable relative to the first capacitor element and designed to generate a capacitive signal. A data processing device is configured to determine the position of the second capacitor element relative to the first capacitor element based on the capacitive signal. The second capacitor element is made of an electrically conductive polymer.

14 Claims, 4 Drawing Sheets

(56) References Cited

U.S. PATENT DOCUMENTS

| | | | |
|---|---|---|---|
| 5,949,161 A * | 9/1999 | Nanba | H02K 41/035 |
| | | | 318/135 |
| 10,408,364 B2 | 9/2019 | Kraft et al. | |
| 2003/0030570 A1* | 2/2003 | Netzer | G01D 5/2415 |
| | | | 340/870.37 |
| 2021/0010830 A1* | 1/2021 | Riehl | F16H 25/2015 |

OTHER PUBLICATIONS

Schmidt et al. Control Element With Improved Capacitive Actuation Force Detection, machine translation and DE 102018124177 (Year: 2020).*

\* cited by examiner

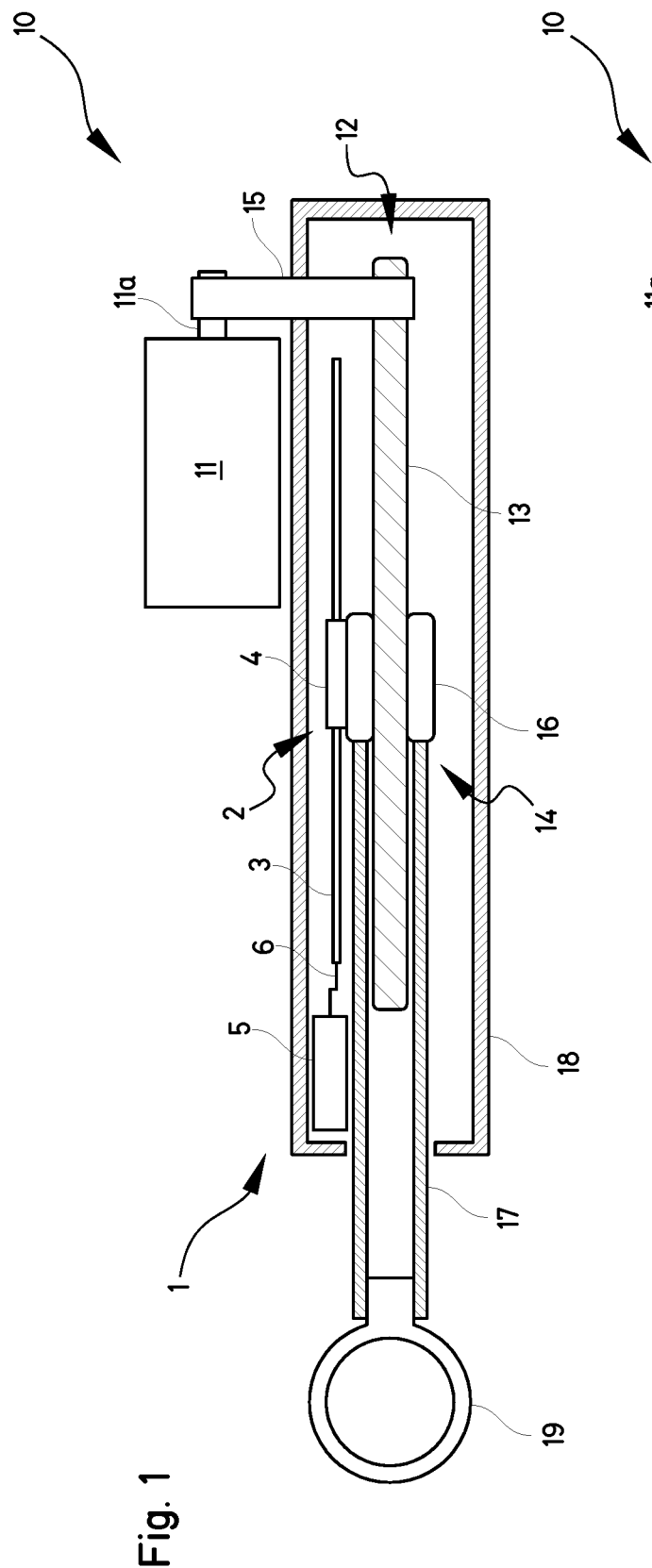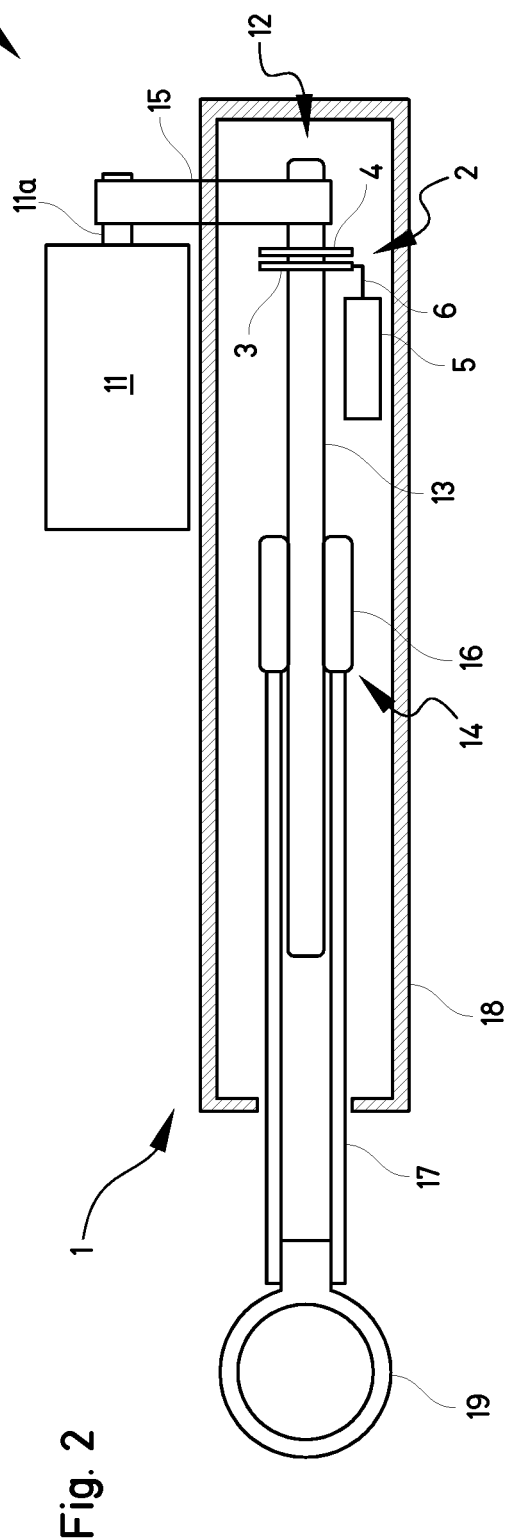

POSITION SENSOR, MANUFACTURING METHOD, AND METHOD FOR DETERMINING A POSITION OF A LINEAR ACTUATOR

FIELD AND BACKGROUND OF THE INVENTION

The present invention relates to a position sensor, in particular for a linear actuator, as well as a production method for such a position sensor, a linear actuator comprising such a position sensor, and also a method for determining a position of a linear actuator.

Position sensors are used in many technical fields to determine the relative position of component parts or modules that are mounted so as to be movable relative to each other. Such component parts or modules mounted so as to be movable relative to one another can be found, for example, in linear actuators, which are used in many technical systems to perform linear movements. Linear actuators usually have a motor and a conversion device driven by the motor, which conversion device can convert a rotary movement of the motor into a linear movement. This conversion device can be designed, for example, as a ball screw drive or roller screw drive and usually has a component, also referred to as a linear unit, which performs the linear movement.

Feedback regarding the position of the linear unit may be required, for example, to limit a mechanical travel distance of the linear actuator, to enable precise positioning or to provide other systems with information regarding the current position of the linear unit. Until now, such position feedback has often been provided by what are known as incremental encoders. However, these systems are often complex and require many component parts, making them costly. For example, an incremental encoder typically requires two sensors, a calculation unit, and a backup unit. When the linear unit moves, the two sensors emit two electrical signals that are 90° out of phase, from which the distance traveled and the direction of movement of the linear unit can be determined. Based on the travel distance and the direction of movement, the calculation unit can determine a position of the linear unit. However, this position determination is indirect, i.e. not absolute.

Therefore, during a shutdown or power failure, the current position information may be lost. To prevent this, the backup unit is usually provided to store the current position information. However, incremental encoders may need to be re-referenced after power-up, as changes in position are not detected when the power is off.

As an alternative to such incremental encoders, what are known as position encoders have therefore been developed, which are usually based on a capacitive measuring principle. Such position encoders also allow direct, i.e. absolute, position determinations.

SUMMARY OF THE INVENTION

It is an object of the present invention to describe an improved, in particular simplified, position sensor, in particular for a linear actuator. In particular, it is an object to determine the position of a linear actuator in a simple and cost-effective manner.

This object is achieved by a position sensor, in particular for a linear actuator, a linear actuator comprising such a position sensor, a production method for a position sensor and a method for determining the position of a linear actuator.

A position sensor, in particular for a linear actuator, according to a first aspect of the invention has a capacitor arrangement and a data processing device. The capacitor arrangement comprises a first capacitor element and a second capacitor element arranged to be movable relative to the first capacitor element and is designed to generate a capacitive signal. The data processing means is designed to determine the position of the second capacitor element relative to the first capacitor element on the basis of the capacitive signal. According to the invention, the second capacitor element is made of an electrically conductive polymer.

One aspect of the invention is based on the approach of providing in a position sensor a capacitor arrangement formed at least of a first capacitor element and a second capacitor element made of an electrically conductive polymer, which second capacitor is mounted so as to be movable relative to the first capacitor element. The second capacitor element is preferably designed for connection to at least one movable component, for example a linear actuator. This allows the second capacitor element to move with the component relative to the first capacitor element when the linear actuator is actuated, i.e. during operation of the linear actuator. Such a second capacitor element, preferably consisting entirely of the electrically conductive polymer, can thereby not only be produced economically and quickly, but is also particularly advantageous for use in linear actuators due to its lower weight compared to conventional, at least partially metallic capacitor elements. Since no metallic components are, or need to be, incorporated into the second capacitor element, the capacitor element can also be made smaller than conventional capacitor elements, making it easier to integrate into a linear actuator. In particular, the second capacitor element may be formed in one piece, i.e., made in one piece or "from one casting." In other words, the second capacitor element may be made exclusively of a polymer that is electrically conductive. For example, the second capacitor element may be made of polyvinyl chloride (PVC), polyether ether ketone (PEEK), polyoxymethylene (POM), polyamide (PA) or the like, optionally with the addition of carbon fibers (CF).

The electrically conductive polymer can additionally facilitate movable mounting of the second capacitor element relative to the first capacitor element. In particular, it is conceivable that the second capacitor element may be slidably mounted on the first capacitor element. The second capacitor element made from the polymer means that dedicated bearings, for example ball bearings or the like, can be dispensed with, thus reducing the number of components and thus gaining installation space and/or saving weight.

Due to the electrical conductivity of the polymer, the capacitor arrangement can be designed to generate a capacitive signal. In this case, a capacitive signal is here in particular a signal, preferably electrical, which characterizes the capacitance of the capacitor arrangement. This signal can vary accordingly with the arrangement of the first and second capacitor elements relative to one another. For example, the signal becomes larger if an area of the first capacitor element covered by the second capacitor element, in particular an electrode arrangement of the first capacitor element, increases. By contrast, the signal becomes smaller, for example, when the area of the first capacitor element, in particular of the electrode arrangement, covered by the second capacitor element decreases. Here, a covered area is, for example, an overlap region in which the first capacitor element, in particular the electrode arrangement, and the second capacitor element are opposite each other.

A data processing device is preferably provided for processing the capacitive signal. It can be designed in particular to determine a position of the second capacitor element relative to the first capacitor element on the basis of the capacitive signal. The position determined in this way can then be output, for example, to a user or to a control device for controlling a drive of the linear actuator.

Preferred embodiments of the invention and refinements thereof are described below, each of which, unless this is expressly excluded, may be combined as desired with the others and with the aspects of the invention described below.

In a preferred embodiment, the first capacitor element has an electrode arrangement and a dielectric layer arranged between the electrode arrangement and the second capacitor element. The electrode arrangement is expediently made of an electrically conductive material and may form one or more conductive regions on the first capacitor element. For processing the capacitive signal, the electrode arrangement is preferably connected for signal exchange to the data processing device, for example by an electrical line.

Preferably, the dielectric layer is applied directly to the electrode arrangement. In other words, the dielectric layer covers the electrode arrangement. By means of the dielectric layer, electrical insulation of the electrode arrangement from the second capacitor element made of the electrically conductive polymer can be achieved. At the same time, the dielectric layer can have a field-amplifying effect, i.e., can contribute to the amplification of an electric field between the electrode arrangement and the second capacitor element. As a result, the capacitive signal that can be generated by the capacitor arrangement can be amplified, thereby reducing an inaccuracy in determining the relative position of the first capacitor element in relation to the second capacitor element.

Preferably, the first capacitor element is designed as a printed circuit board (pcb). Such printed circuit boards can be produced on a large scale and at very low cost. At the same time, such printed circuit boards can also be manufactured very quickly and precisely. As a result, the availability of the first capacitor element can be increased and at the same time the cost of the position sensor formed with it can be reduced.

The electrode arrangement is expediently formed here from one or more conductor tracks or areas on the printed circuit board. These conductor tracks or areas—and thus also the electrode arrangement—are advantageously made of copper. The processing of copper on printed circuit boards to form conductor tracks, for example by etching, is well known and can be very well controlled. Therefore, a well-defined electrode arrangement can easily be created in this way. In addition, conductor tracks with very small extents can be precisely manufactured. This not only allows a position sensor of small dimensions but can also increase the detection accuracy.

The dielectric layer is expediently formed here from solder resist, for example epoxy resin.

In another preferred embodiment, the position sensor comprises a guide device for guiding a movement of the second capacitor element relative to the first capacitor element. In this case, the guide device can have one or more bearings or can be formed therefrom. The guide device is expediently designed for guiding the second capacitor element relative to the first capacitor element on a sliding bearing. Alternatively or additionally, however, the guide device can also be designed for ball-bearing guidance of the second capacitor element relative to the first capacitor element. The guide device can, for example, comprise a rail arrangement, in particular at least one rail element, along which the first and/or second capacitor element can be moved. The guide device can ensure reliable and precise movement of the second capacitor element relative to the first capacitor element.

Preferably, the guide device is formed by the first capacitor element and/or the second capacitor element. In other words, at least one part of the guide device can be formed as part of the first and/or second capacitor element. In particular, at least a part of the guide device may be formed integrally with the first and/or second capacitor element. For example, the guide device may be at least partially made of the electrically conductive polymer and/or formed by the printed circuit board. This enables a particularly space- and component part-saving realization of the guide device.

For example, the first and/or second capacitor element can have one or more projections which are arranged and/or formed in such a way that the other capacitor element can be moved along this or these projections. By moving along the projections, the first or second capacitor element can be reliably kept "on track", i.e. guided in a straight line.

In a further preferred embodiment, the second capacitor element is mounted so as to be rotatable relative to the first capacitor element. The capacitive signal in this case preferably characterizes a torsion angle between the first and the second capacitor element. The position sensor with a rotatably mounted second capacitor element can be used, for example, to precisely monitor the rotation of a drive shaft or the rotation of a spindle of a threaded or roller drive coupled to the drive shaft. In particular, the number of revolutions of the drive shaft or spindle can be determined, if necessary, from which a travel distance of a linear unit can be concluded.

In another preferred embodiment, the second capacitor element or the first capacitor element has a projection with an at least substantially circular circumference, and the other capacitor element has a circular opening in which the projection engages. The projection may be cylindrical or conical, for example. The opening can be, for example, the opening of a bore, i.e., a round recess, or a through-hole. The engagement of the projection in the opening allows the movability of the second capacitor element in a plane parallel to the first capacitor element to be limited to a rotation in this plane in a simple manner.

In another preferred embodiment, the second capacitor element has an external toothing for generating movement of the second capacitor element relative to the first capacitor element. With the aid of the external toothing, the second capacitor element can be easily coupled to rotatable components of the linear actuator, for example to a drive shaft or a spindle. This makes it easy to integrate the position sensor into the linear actuator.

In another preferred embodiment, the second capacitor element is mounted for linear movement relative to the first capacitor element. In other words, the second capacitor element is designed to perform a translational movement relative to the first capacitor element. An absolute position of the linear unit can thus be determined directly.

In a further preferred embodiment, the second capacitor element or the first capacitor element has at least one guide rail in the form of an elongate projection, i.e. extending in the longitudinal direction of the second or first capacitor element. Preferably, the other capacitor element is designed to bear against the at least one guide rail. A lateral slipping as well as a twisting of the second capacitor element during the movement relative to the first capacitor element can thus be avoided or a corresponding risk of slipping or twisting can at least be reduced. When moving relative to the first capacitor element, the second capacitor element can thus be reliably kept "on track".

In a further preferred embodiment, the second capacitor element or the first capacitor element has two parallel guide rails, each in the form of an elongate projection. The other capacitor element is preferably arranged at least in sections between the two guide rails. The two guide rails can thus form a lateral receptacle for the other capacitor element. This enables a particularly reliable orientation of the second capacitor element on the first capacitor element, in particular a particularly reliable lateral positioning of the second capacitor element relative to the first capacitor element.

In a further preferred embodiment, the first capacitor element has a surface on which the second capacitor element slides during its movement relative to the first capacitor element. This surface is preferably formed by the dielectric layer of the first capacitor element, in particular by the solder resist. By sliding on the surface, dedicated bearings for supporting the second capacitor element can be dispensed with. In particular, the capacitor arrangement can thus be designed to be especially compact.

In a further preferred embodiment, the second capacitor element has an elastic securing element that is designed to secure the second capacitor element relative to the first capacitor element with respect to at least one degree of freedom. The securing element can be designed, for example, as a spring element, in particular as a leaf spring. In this case, the securing element is preferably designed to press the second capacitor element against the first capacitor element, in particular the dielectric layer. This allows a constant distance between the first and second capacitor elements to be reliably set. In particular, a secure fit of the second capacitor element in the linear actuator can be ensured. For example, the second capacitor element can be reliably prevented from popping out of the guide device during a movement relative to the first capacitor element.

For example, the securing element can be arranged in such a way that it is supported on a housing of the linear actuator. For example, the second capacitor element can be arranged between the housing and the first capacitor element in such a way that the securing element bears against the housing and is elastically deformed. The spring force generated during this deformation can reliably press the second capacitor element onto the first capacitor element, for example into the guide device.

In a further preferred embodiment, the capacitor arrangement has at least one further capacitor element arranged movably relative to the first capacitor element. The capacitor arrangement is expediently set up accordingly to generate at least one further capacitive signal in addition to the capacitive signal. The data processing device is expediently also set up correspondingly to determine, in addition to the position of the second capacitor element relative to the first capacitor element, at least one further position of the at least one further capacitor element relative to the first capacitor element, more specifically based on the at least one further capacitive signal. The at least one further capacitor element allows the measuring range of the position sensor to be extended and/or the measuring accuracy of the position sensor to be increased.

The second capacitor element and the at least one further capacitor element are movable here relative to the first capacitor element preferably in a manner dependent on one another. This means that the position of the at least one further capacitor element relative to the first capacitor element also preferably changes in a defined manner when the second capacitor element moves relative to the first capacitor element. In this case, the at least one further capacitor element can preferably be connected, analogously to the second capacitor element, to at least one movable component of the linear actuator in such a way that when the linear actuator is actuated, i.e. during operation of the linear actuator, the at least one further capacitor element is also moved relative to the first capacitor element.

With the aid of the at least one further capacitor element, for example, a so-called multiturn absolute encoder can be realized for the linear actuator, with which angles of rotation of a rotatable component of the linear actuator of more than 360° can be determined. For this purpose, the number of full rotations of the second or the at least one further capacitor element relative to the first capacitor element can be coded by the position of the other capacitor element relative to the first capacitor element. This means that the position of the second or the at least one further capacitor element relative to the first capacitor element can be assigned to one of several possible positions of the rotatable component by the position of the other capacitor element relative to the first capacitor element.

If, for example, only the second capacitor element is connected to the rotatable component in such a way that a rotation of the rotatable component also causes a rotation of the second capacitor element relative to the first capacitor element, it is not possible to derive from the corresponding capacitive signal how often the component has already rotated. However, if at least one further capacitor element is also connected to the rotatable component in such a way that a rotation of the rotatable component causes only a fraction of a rotation of the at least one further capacitor element, the number of rotations can be determined with the aid of the corresponding at least one further capacitive signal and the exact orientation of the rotatable component can be determined with the aid of the capacitive signal.

A linear actuator according to a second aspect of the invention comprises a position sensor according to the first aspect of the invention. The linear actuator expediently comprises a drive, for example an electric motor, and a conversion device for converting a rotary motion generated by the drive into a linear motion also referred to as a translational motion. The conversion device can be designed, for example, as a screw drive, in particular as a ball or roller screw drive, and can have a screw, also referred to as a spindle or lead screw, and a nut movable on this screw. Preferably, the spindle is coupled to the actuator, for example via a transmission, so that the nut forms the linear unit of the linear actuator. However, variants are also possible in which the drive is coupled to the nut so that the spindle forms the linear unit.

Preferably, the second capacitor element is connected here to a movable component of the linear actuator, in particular is fastened to this component, in such a way that actuation of the linear actuator, i.e., movement of the linear unit, causes the second capacitor element to move relative to the first capacitor element. For example, the second capacitor element may be directly attached to the linear unit. Alternatively, however, the second capacitor element may also be attached to or at least coupled to a drive shaft of the drive.

Based on the determined position of the second capacitor element relative to the first capacitor element, a position of the linear actuator can thereby also be determined. A position of the linear actuator is characterized here in particular by a position of the linear unit. A position of the linear actuator can be defined, for example, by the ratio of the distance traveled by the linear unit to the maximum possible travel distance.

In the method for determining a position of a linear actuator according to a third aspect of the invention, (i) a capacitive signal is generated using a capacitor arrangement comprising a first capacitor element and a second capacitor element arranged to be movable relative to the first capacitor element and made of an electrically conductive polymer, and (ii) a position of the second capacitor element relative to the first capacitor element is determined based on the capacitive signal using a data processing device. The method may be used, for example, to determine the position of a linear actuator in accordance with the second aspect of the invention. In particular, the method is preferably performed using a position sensor according to the first aspect of the invention.

In the method of producing a position sensor according to a fourth aspect of the invention, (i) a first capacitor element is provided, (ii) a second capacitor element is additively manufactured from an electrically conductive polymer, (iii) the second capacitor element is arranged to be movable relative to the first capacitor element in a capacitor arrangement so that a capacitive signal can be generated by the capacitor arrangement formed, and (iv) the capacitor arrangement is connected for signal exchange to a data processing device to determine a position of the second capacitor element relative to the first capacitor element on the basis of the capacitive signal. Preferably, a position sensor can thus be produced in accordance with the first aspect of the invention.

The second capacitor element is preferably manufactured here in one piece. The second capacitor element can be manufactured from the electrically conductive polymer by selective laser sintering (SLS), for example. This allows the second capacitor element to be manufactured economically and on an as-needed basis. Overall, a position sensor formed of only a few components with small dimensions and low weight can be manufactured, which is therefore particularly advantageous for integration in a linear actuator.

The invention will be explained in more detail hereinafter with reference to figures. Where appropriate, elements having the same effect are given the same reference signs herein. The invention is not limited to the embodiments shown in the figures—not even with respect to functional features. The previous description as well as the following description of figures contain numerous features, some of which are reproduced in various combinations in the dependent claims. However, a person skilled in the art will also consider these features as well as all other features disclosed above and in the following description of the figures individually and will combine them to form useful further combinations. In particular, all of the above features can each be combined individually and in any suitable combination with the position sensor according to the first aspect of the invention, the linear actuator according to the second aspect of the invention, the method according to the third aspect of the invention, and the production method according to the third aspect of the invention.

The figures show, at least partially in schematic form:

BRIEF DESCRIPTION OF THE FIGURES

FIG. 1 a first example of a linear actuator with a position sensor;

FIG. 2 a second example of a linear actuator with a position sensor;

DESCRIPTION OF THE INVENTION

Figure 3:
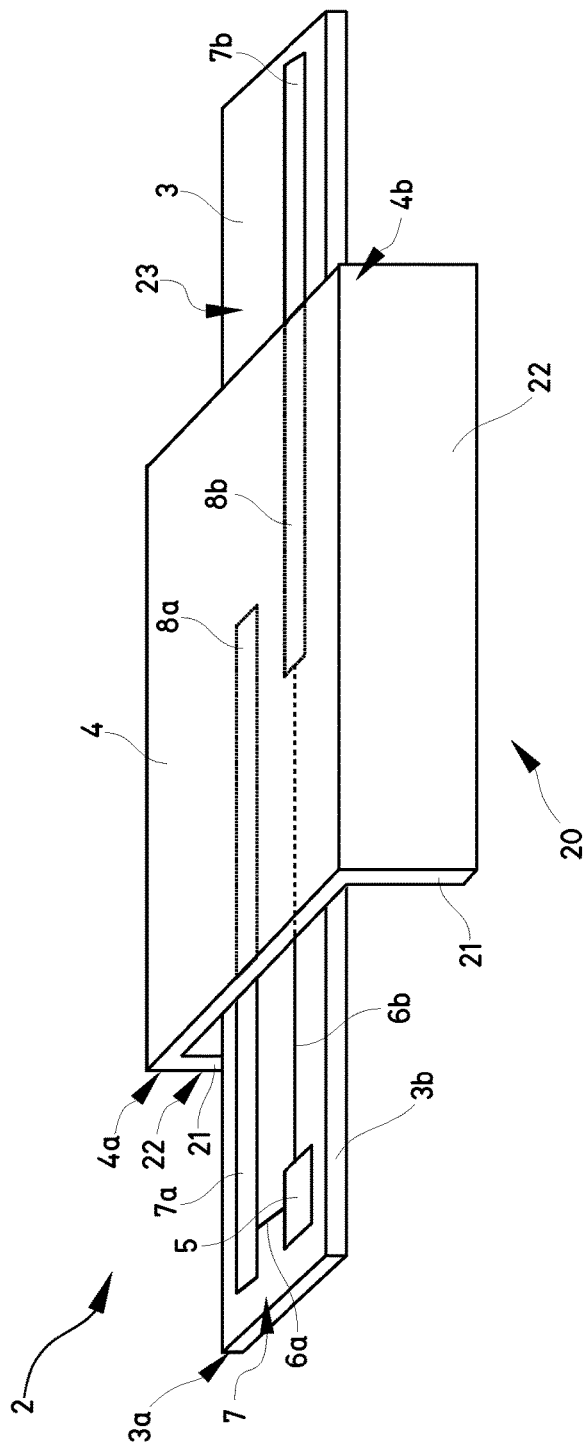
FIG. 3 an example of a capacitor arrangement.

FIG. 1 shows a first example of a linear actuator 10 with a position sensor 1 for determining a position of the linear actuator 10. The position sensor 1 has a capacitor arrangement 2 with a first capacitor element 3 and a second capacitor element 4 mounted so as to be movable relative to the first capacitor element 3, as well as a data processing device 5. In the present example, the second capacitor element 4 is movable in a straight line along the first capacitor element 3. The second capacitor element 4 can be designed, for example, as a carriage running on the first capacitor element 3.

The linear actuator 10 further has a drive 11 and a conversion device 12 with a spindle 13 and a linear unit 14 that can be driven by the spindle 13, in particular is movable in linear fashion. The drive 11 is coupled here to the spindle 13 via a transmission 15. As a result, a rotation of a drive shaft 11a of the drive 11, for example of an electric motor, can be transmitted to the conversion device 12. In this regard, the linear unit 14 comprises a nut 16 having an internal thread that engages with an external thread of the spindle 13. This allows the conversion device 12 to convert the rotation of the drive shaft 11a transmitted to the spindle 13 into a translation of the nut 16, and thus of a thrust sleeve 17 attached to the nut 16.

The position sensor 1 and the conversion device 12 are arranged in a housing 18. The thrust sleeve 17 can protrude at least in sections from the housing 18 through an opening. In particular, the thrust sleeve 17 may protrude at least in sections through the opening from the housing 18 or may be retracted into the housing 18 during translation.

At an end of the thrust sleeve 17 opposite the nut 16, an actuating element 19 is attached to the thrust sleeve 17, for example, screwed into the thrust sleeve 19. The actuating element 19 can be attached to a load, and thus the load can be moved linearly.

The second capacitor element 4 is expediently made of an electrically conductive polymer. In particular, the second capacitor element 4 may be made in one piece, i.e. made entirely of the electrically conductive polymer. Although the second capacitor element 4 does not comprise a metallic component, for example a metallic electrode arrangement, the capacitor arrangement 2 can thus generate a capacitive signal.

The capacitive signal can be characteristic of the position of the second capacitor element 4 relative to the first capacitor element 3. The data processing device 5 is preferably designed to process this signal. For this purpose, the data processing device 5 is expediently connected for signal exchange to the capacitor arrangement 2, in particular to the first capacitor element 3, for example via a signal line 6. On the basis of the capacitive signal thus provided at the data processing device 5, the processing device 5 can then determine the position of the second capacitor element 4 relative to the first capacitor element 3.

Preferably, the data processing device 5 is also designed to derive the position of the linear actuator 10 from the determined relative position of the first and second capacitor elements 3, 4. The position of the linear actuator 10 may, for example, be defined by the position of the linear unit 14 or the nut 16 within the housing 18. As a result, the position of the linear actuator 10 can also be characterized by how far the thrust sleeve 17 protrudes from the housing 18, i.e. is extended.

In order to be able to draw conclusions about the position of the linear actuator 10 on the basis of the relative position of the first and second capacitor elements 3, 4, the second capacitor element 4 is preferably connected to the linear unit 14 in such a way that when the linear unit 14 is moved, the second capacitor element 4 is also moved relative to the first capacitor element 3. This can be achieved in a simple manner, for example, by fastening the second capacitor element 4 to the linear unit 14, in particular to the nut 16, for example by screwing it on, gluing it on, receiving it in a form-fitting manner and/or the like.

In a variant not shown here, it is even conceivable that the second capacitor element 4 is formed by the linear unit 14, in particular by the nut 16. For this purpose, the linear unit 14, in particular the nut 16, can be made of the electrically conductive polymer. In this way, the number of components of the linear actuator 10 can be further reduced. In particular, the dimensions of the linear actuator 10 and/or its weight can thus be further reduced.

FIG. 2 shows a second example of a linear actuator 10 with a position sensor 1 for determining a position of the linear actuator 10. The linear actuator 10 is preferably substantially identical to the linear actuator shown in FIG. 1. In particular, it can have a drive 11, a conversion device 12 with a spindle 13 and a linear unit 14, and a transmission 15 for coupling a drive shaft 11a of the drive 11 to the conversion device 12, in particular to the spindle 13. Here, too, a thrust sleeve 17 is preferably attached to a nut 16 of the linear unit 14, so that the thrust sleeve 17 together with an actuating element 19 can be extended from a housing 18 or retracted into the housing 18 by the translation of the linear unit 14 along the spindle 13.

By contrast, the position sensor 1 in FIG. 2 is designed differently from the position sensor in FIG. 1. In the present case, a second capacitor element 4 is not arranged so as to be movable in a straight line relative to a first capacitor element 3 of a capacitor arrangement 2, but is rotatable. Consequently, at least the second capacitor element 4, and preferably also the first capacitor element 3, is disc-like.

While the first capacitor element 3 is preferably stationary in the housing 18, the second capacitor element 4 is preferably seated on the spindle 13 in a manner fixed against rotation. As a result, a capacitive signal provided by the capacitor arrangement 2 via a signal line 6 to a data processing device 5 can characterize an angle of rotation of the second capacitor element 4 relative to the first capacitor element 3 and thus also to the spindle 13. Accordingly, the data processing device 5 may be designed to determine a position of the second capacitor element 4 relative to the first capacitor element 3 based on the capacitive signal. By directly seating the second capacitor element 4 on the spindle 13, a high angular resolution of the position sensor 1 can thereby be achieved.

In addition, the data processing device 5 can also be designed to determine the position of the linear actuator 10 based on the determined position of the second capacitor element 4 relative to the first capacitor element 3, in particular the capacitive signal. Expediently, the data processing device 5 is thereby designed to base the determination of the position of the linear actuator 10 on a predetermined stroke of the linear unit 14 during one rotation of the spindle 13. The rotation of the spindle 13 or of the second capacitor element 4 can thus be easily converted into a position of the linear unit 14.

As an alternative to the example shown in FIG. 2, the second capacitor element 4 can also be coupled to the spindle 13 in another way. In one variant, the second capacitor element 4 can have an external toothing and can be arranged to mesh with a gear wheel that is seated non-rotatably on the spindle 13. Such a coupling has the advantage that, if necessary, the measuring range of the position sensor 1 can be extended. This is because with a second capacitor element 4 seated non-rotatably on the spindle 13, it is only possible to resolve a stroke of the linear unit 14 which corresponds to one revolution of the spindle 13 (and thus one revolution of the second capacitor element 4). By contrast, a negative transmission ratio between the gear wheel, which is seated non-rotatably on the spindle 13, and the externally toothed second capacitor element 4 can be selected in such a way that one revolution of the spindle 13 causes only a fraction of a revolution of the second capacitor element 4. In other words, the second capacitor element 4 can be stepped down in such a way that a stroke of the linear unit 14 corresponding to several revolutions of the spindle 13 can also be resolved.

In these variants described above, the second capacitor element 4 does not necessarily have to be arranged in the region of the spindle 13. Rather, it is also conceivable that, for example, the gear wheel for driving the externally toothed second capacitor element 4 is arranged non-rotatably on another rotating component of the linear actuator 10, for example directly on the drive shaft 11a.

FIG. 3 shows an example of a capacitor arrangement 2 of a position sensor for a linear actuator. The capacitor arrangement 2 comprises a first capacitor element 3 and a second capacitor element 4, which is mounted so as to be movable relative to the first capacitor element 3. The first capacitor element 3 preferably comprises an electrode arrangement 7 made of an electrically conductive material, for example a metal. The second capacitor element 4 is expediently made of an electrically conductive polymer. The capacitor arrangement 2 is thus designed to generate a capacitive signal.

The capacitive signal is preferably characteristic here of a position of the second capacitor element 4 relative to the first capacitor element 3. For this purpose, the electrode arrangement 7 has at least one metallic electrode, in the present example two electrodes 7a, 7b, both of which can interact electrically with the second capacitor element 4. For example, an electromagnetic field can be generated between each of the electrodes 7a, 7b and the second capacitor element 4. Therefore, in the present example, the capacitive signal may include two signal components, namely one signal component per each electrode 7a, 7b. For example, the ratio of these two signal components makes it possible to conclude the relative position of the first and second capacitor elements 3, 4.

The electrodes 7a, 7b expediently do not extend over the entire length of the first capacitor element 3. Rather, they are preferably each formed in such a way that an overlap region 8a, 8b, shown hatched in FIG. 3, in which the electrodes 7a, 7b respectively and the second capacitor element 4 are opposite each other, can change when the second capacitor element 4 moves relative to the first capacitor element 3. The change of the overlap region 8a, 8b also changes the corresponding signal component.

If the second capacitor element 4 is moved to the right in the present example, the overlap region 8a between the first electrode 7a and the second capacitor element 4 decreases. Consequently, the signal component that can be assigned to the first electrode 7a becomes smaller. At the same time, however, the overlap region 8b between the second electrode 7b and the second capacitor element 4 increases. Thus, the signal component that can be assigned to the second electrode increases.

In order to achieve precise guidance of the second capacitor element 4 during movement relative to the first capacitor element 3, a guide device 20 may be provided. In the present example, the guide device 20 is formed by at least part of the second capacitor element 4. For this purpose, the second capacitor element 4 has two guide rails 21 in the form of elongate projections 22. The projections 22 extend along two opposite longitudinal edges 4a, 4b of the capacitor element 4. The projections 22 are expediently designed in such a way that the first capacitor element 3 can be arranged between them. This allows two longitudinal edges 3a, 3b of the first capacitor element 3 to bear against the projections 22. The second capacitor element 4 can thus be designed as a carriage, which enables a rectilinear movement of the second capacitor element 4 relative to the first capacitor element 3.

The signal generated by the capacitor arrangement 2 can preferably be processed with the aid of a data processing device 5. The data processing device 5 can, for example, be designed to determine the position of the second capacitor element 4 relative to the first capacitor element 3 on the basis of the capacitive signal. Preferably, the data processing device 5 is also designed to output the determined position, for example to a user or to another component of the linear actuator, for example to a drive controller.

For processing the capacitive signal, the electrodes 7a, 7b are connected for signal exchange to the data processing device 5 via a signal line with one line part 6a, 6b per electrode 7a, 7b. In the present example, the first capacitor element 3 is formed as a printed circuit board (pcb) 23. Such printed circuit boards 23 are also referred to as printed circuits and can, for example, be made of an electrically insulating carrier, for example a fiber-reinforced plastic, on which electrically conductive connections are arranged. These connections, also referred to as conductor tracks, are preferably etched from a thin copper layer. The printed circuit board 23 preferably also comprises a layer of an electrically insulating solder resist, which covers the conductor tracks on the surface of the carrier and protects them from corrosion, for example.

In addition to the signal line, in particular the two line parts 6a, 6b, the electrode arrangement 7, in particular the electrodes 7a, 7b, can also be formed as conductor tracks of the printed circuit board 23. To form the electrode arrangement 7, in particular the electrodes 7a, 7b, the corresponding conductor tracks of the printed circuit board 23 can be made correspondingly wider, at least in sections. The first capacitor element 3 can thus be manufactured with little effort.

Another advantage of the design of the first capacitor element 3 as a printed circuit board 23 is that the solder resist can form a dielectric layer of the capacitor arrangement 2. This allows the electric fields between the electrodes 7a, 7b of the electrode arrangement 7 and the second capacitor element 4 and thus also the capacitive signal to be amplified. The dielectric layer can also form a surface of the first capacitor element 3 on which the second capacitor element 4 slides during its movement relative to the first capacitor element 1. In this case, the relatively low coefficient of friction of the solder resist can be utilized to advantage.

Figure 4:
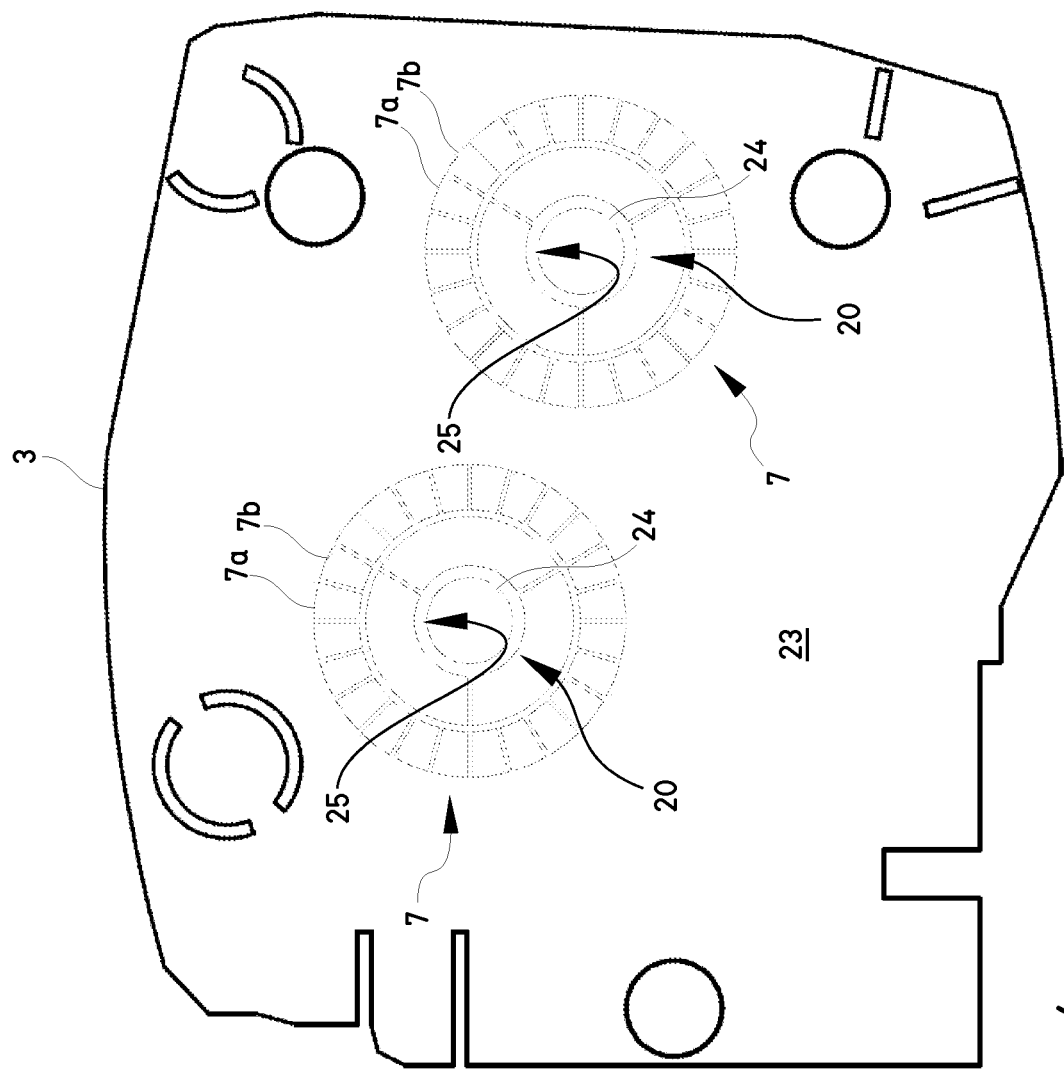
FIG. 4 an example of a first capacitor element.

FIG. 4 shows an example of a first capacitor element 3 which, analogously to the first capacitor element shown in FIG. 3, is expediently designed as a printed circuit board 23. In the example shown, the first capacitor element 3 has two electrode arrangements 7 with a plurality of electrodes 7a, 7b, of which only two are provided with a reference sign for reasons of clarity. With the aid of the two electrode arrangements 7, what is known as a multiturn rotary encoder can be realized by arranging a second capacitor element (see FIG. 5) opposite one of the electrode arrangements 7 and a further capacitor element, analogous to the second capacitor element, opposite the other of the electrode arrangements 7.

The electrodes 7a, 7b are arranged in a circle so that at least part of the electrode arrangement 7 is always opposite the second or further capacitor element when the opposite capacitor element is rotated relative to the first capacitor element 3. The electrodes 7a, 7b can be designed as segment electrodes, each corresponding to a circular segment of the circular electrode arrangement. The radially outer electrodes 7a, 7b in FIG. 4 can be provided, for example, for transmitting an excitation signal to the second or further capacitor element, while the radially inner electrodes in FIG. 4 (without reference signs) are preferably provided for coupling the signal out of the second or further capacitor element.

In the present example, the first capacitor element 3 additionally comprises two openings 24 preferably formed concentrically with the circularly arranged electrodes 7a, 7b. Each of the openings 24 may, for example, form part of a guide device 20 for guiding a rotational movement of the second capacitor element relative to the first capacitor element 3. It is conceivable, for example, that the openings 24 are designed to receive a corresponding projection of the second or further capacitor element. In this regard, the inner edge of each opening 24 preferably has a metallic finish 25, for example a coating of a metal or a metal fitting, to minimize abrasion.

Figure 5:
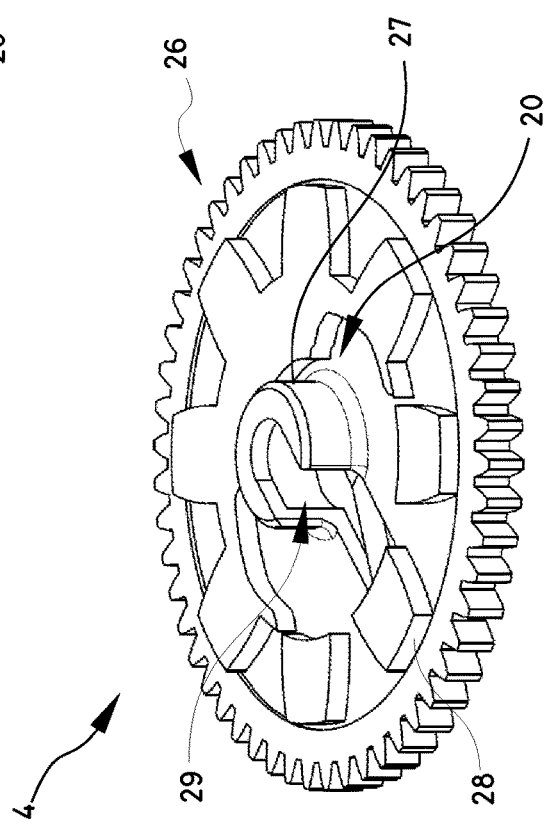
FIG. 5 an example of a second capacitor element.

FIG. 5 shows an example of a second capacitor element 4, which is expediently made of an electrically conductive polymer. The second capacitor element 4 is disc-like and has an external toothing 26 which can be engaged with a toothing on a movable component of a linear actuator, for example a gear wheel seated on a drive shaft. On a first axial side face 4c, the second capacitor element 4 also has a plurality of elevations 28 which are provided for arrangement opposite an electrode arrangement, in particular electrodes, of a first capacitor element (see FIG. 4). The elevations 28 can thus be designed in particular for receiving an excitation signal from the first capacitor element. At least one region of at least one elevation can furthermore be designed for coupling out the signal from the second capacitor element 4. The decoupled (capacitive) signal is thereby preferably dependent on an overlap region between the elevations 28 and the electrode arrangement of the first capacitor element and is thus characteristic of the position of the second capacitor element 4 relative to the first capacitor element. For reasons of clarity, only one of the elevations is provided with a reference sign.

The elevations 28 in this case project beyond the external toothing 26 in the axial direction. This allows the second capacitor element 4 to bear against or slide on the first capacitor element, in particular a dielectric layer, by means of the elevations 28.

The second capacitor element 4 additionally has a projection 27 having a substantially circular circumference. The projection 27 is preferably arranged concentrically with an axis of rotation of the second capacitor element 4 and may form part of a guide means 20 for guiding a movement of the second capacitor element 4 relative to the first capacitor element. For example, the projection 27 may be designed to engage in a corresponding opening of a first capacitor element (see FIG. 4).

Preferably, the projection 27 is formed at least in sections as a hollow cylinder with a recess 29 on its outer surface. The recess 29 can also extend from the projection 27 as a through-hole into the axial side face, in particular as far as an elevation 28, of the second capacitor element 4. This allows space to be created for a securing element of the second capacitor element 4 (see FIG. 6), which can be elastically deformed into the recess 29 under load.

Figure 6:
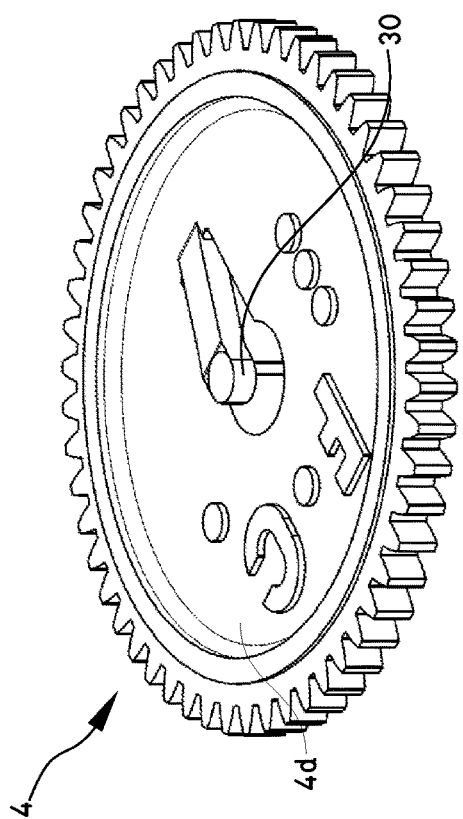
FIG. 6 the second capacitor element of FIG. 5 from another perspective.

FIG. 6 shows the second capacitor element 4 from FIG. 5 from a different perspective. In contrast to FIG. 5, a second axial side face 4d and thus the securing element 30, instead of the elevations and the projection on the first axial side face, are now facing the viewer.

The securing element 30 is preferably elastic and protrudes from the second axial side surface 4d. In particular, the securing element 30 can be designed to generate a spring force in the event of elastic deformation. This allows the second capacitor element 4 to be clamped, for example, between a component of a linear actuator, for example a housing, and the first capacitor element, for example the printed circuit board shown in FIG. 4. The securing element 30 can thereby reliably prevent the projection (see FIG. 5) from popping out of the opening of the first capacitor element (see FIG. 4) during a rotation of the second capacitor element 4 relative to the first capacitor element.

Figure 7:
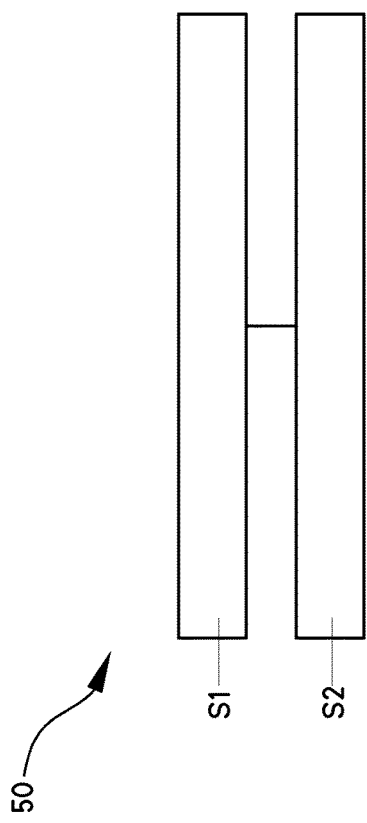
FIG. 7 an example of a method for determining a position of a linear actuator.

FIG. 7 shows an example of a method 50 for determining a position of a linear actuator.

In a method step S1, a capacitive signal is generated with the aid of a capacitor arrangement. The capacitor arrangement expediently has a first capacitor element and a second capacitor element which is arranged so as to be movable relative to the first capacitor element and is preferably made of an electrically conductive polymer.

The second capacitor element is preferably coupled here to a movable component of the linear actuator, for example to a linear unit or a drive shaft of a drive of the linear actuator. Thus, a movement of the movable component can be translated into a movement of the second capacitor element. The position of the linear actuator can thus be derived from a position of the second capacitor element relative to the first capacitor element.

Accordingly, in a further method step S2, a position of the second capacitor element relative to the first capacitor element is determined with the aid of a data processing device on the basis of the capacitive signal. The determined position is preferably output, for example to a user and/or another component of the linear actuator, such as a drive controller.

Figure 8:
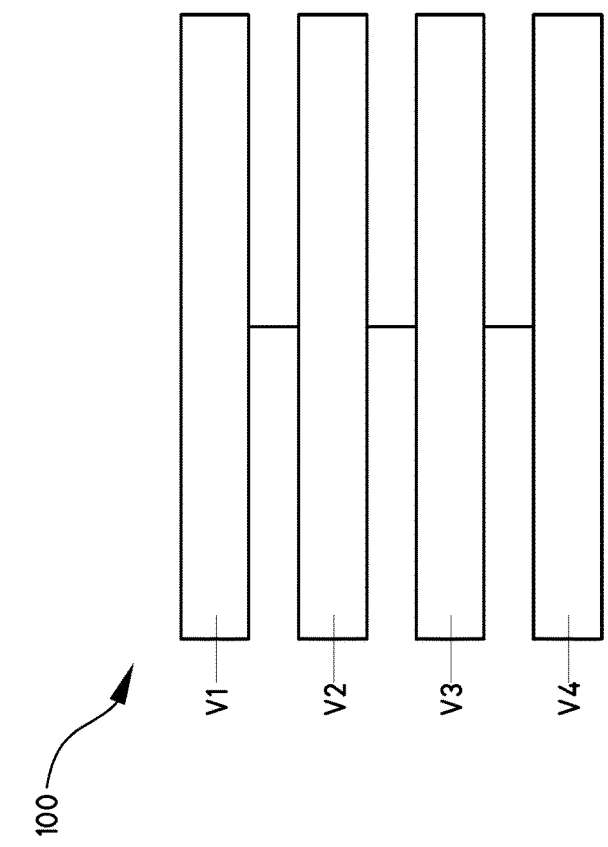
FIG. 8 an example of a method for producing a position sensor.

FIG. 8 shows an example of a production method 100 for a position sensor.

In a method step V1, a first capacitor element is provided. For this purpose, for example, a printed circuit board can be manufactured. The conductor tracks of the printed circuit board formed here, for example copper conductor tracks produced by etching, can form an electrode arrangement of the first capacitor element at least in sections.

In a further method step V2, a second capacitor element is additively manufactured from an electrically conductive polymer. For example, the second capacitor element can be manufactured by selective laser sintering (SLS). As a result, the shape of the second capacitor element is substantially freely predeterminable.

In a further method step V3, the second capacitor element is arranged movably relative to the first capacitor element in a capacitor arrangement so that a capacitive signal can be generated by the capacitor arrangement formed. For this purpose, the second capacitor element can be placed on the first capacitor element in a carriage-like manner, for example, so that the second capacitor element can slide in a straight line along the first capacitor element. Alternatively, the second capacitor element may be at least partially inserted into the first capacitor element so that the second capacitor element can rotate relative to the first capacitor element. For example, a cylindrical or conical projection of the second capacitor element may be engaged with an opening in the first capacitor element such that the second capacitor element is rotatable about the projection.

In a further method step V4, the capacitor arrangement is connected for signal exchange to a data processing device for determining a position of the second capacitor element relative to the first capacitor element based on the capacitive signal. For this purpose, the first capacitor element, in particular an electrode arrangement of the first capacitor element, can be electrically conductively connected to the data processing device.

In this context, it is conceivable that method step V4 is carried out substantially simultaneously with method step V2, i.e. within the scope of the latter. Thus, a signal line, in particular a plurality of line parts (see FIG. 3), can be manufactured simultaneously with the electrode arrangement, in particular if the data processing device is also arranged on the printed circuit board or is even at least partially formed by the printed circuit board.

LIST OF REFERENCE SIGNS

1 Position sensor
2 Capacitor arrangement
3 First capacitor element
3a, 3b Longitudinal edge
4 Second capacitor element
4a, 4b Longitudinal edge
4c, 4d Side face
5 Data processing device
6 Signal line
6a, 6b Line parts
7 Electrode arrangement
7a, 7b Electrode
8a, 8b Overlap region
10 Linear actuator
11 Drive
11a Drive shaft
12 Conversion device
13 Spindle
14 Linear unit
15 Transmission
16 Nut
17 Thrust sleeve
18 Housing
19 Actuating element
20 Guide device
21 Guide rail
22 Elongate projection
23 Printed circuit board
24 Opening
25 Metallic finish 26 External toothing
27 Projection
28 Elevation
29 Recess
30 Securing element
50 Method
100 Production method
S1, S2 Method steps of the method
V1-V4 Method steps of the production method

The invention claimed is:

1. A position sensor for a linear actuator, comprising:
a capacitor arrangement having a first capacitor element and a second capacitor element, said second capacitor element being movable relative to said first capacitor element and configured to generate a capacitive signal, said second capacitor element being made of an electrically conductive polymer; and
a data processing device for determining a position of said second capacitor element relative to said first capacitor element based on said capacitive signal; and
a guide device configured for guiding a movement of said second capacitor element relative to said first capacitor element, wherein at least a part of said first capacitor element and/or said second capacitor element forms at least a part of said guide device so as to contribute to guiding the movement.

2. The position sensor according to claim 1, wherein said first capacitor element has an electrode arrangement and a dielectric layer, said dielectric layer being arranged between said electrode arrangement and said second capacitor element, and said first capacitor element is a printed circuit board.

3. The position sensor according to claim 1, wherein said second capacitor element is rotatable relative to said first capacitor element.

4. The position sensor according to claim 1, wherein one of said second capacitor element and said first capacitor element has a projection with a substantially circular circumference, and the other of said second capacitor element and said first capacitor element has a circular opening in which said projection engages.

5. The position sensor according to claim 1, wherein said second capacitor element has an external toothing for generating a movement of said second capacitor element relative to said first capacitor element.

6. The position sensor according to claim 1, wherein said second capacitor element is linearly movable relative to said first capacitor element.

7. The position sensor according to claim 6, wherein one of said second capacitor element and said first capacitor element has two parallel guide rails configured as an elongate projection, and the other of said second capacitor element and said first capacitor element is arranged at least in sections between said two parallel guide rails.

8. The position sensor according to claim 1, wherein one of said second capacitor element and said first capacitor element has at least one guide rail configured as an elongate projection, and the other of said second capacitor element and said first capacitor element is configured to rest against said at least one guide rail.

9. The position sensor according to claim 1, wherein said first capacitor element has a surface on which said second capacitor element slides during a movement of said second capacitor element relative to said first capacitor element.

10. The position sensor according to claim 1, wherein said second capacitor element has an elastic securing element configured to secure said second capacitor element relative to said first capacitor element with respect to at least one degree of freedom.

11. The position sensor according to claim 1, wherein said capacitor arrangement has at least one further capacitor element movable relative to said first capacitor element.

12. A linear actuator, comprising a position sensor according to claim 1.

13. A method for determining a position of a linear actuator, the method comprising:
providing a capacitor arrangement with a first capacitor element and a second capacitor element, the second capacitor element being made of an electrically conductive polymer and being movable relative to the first capacitor element;
generating a capacitive signal with the capacitor arrangement; and
determining a position of the second capacitor element relative to the first capacitor element by a data processing device based on the capacitive signal; and
guiding a movement of the second capacitor element relative to the first capacitor element via a guide device, wherein at least a part of the first capacitor element and/or the second capacitor element forms at least a part of the guide device so as to contribute to guiding the movement.

14. A method of producing a position sensor, the method comprising:
providing a first capacitor element,
additively manufacturing a second capacitor element from an electrically conductive polymer,
arranging the second capacitor element to be movable relative to the first capacitor element in a capacitor arrangement, so that a capacitive signal can be generated by the formed capacitor arrangement, and
connecting the capacitor arrangement for signal exchange to a data processing device for determining a position of the second capacitor element relative to the first capacitor element based on the capacitive signal; and
providing a guide device configured for guiding a movement of the second capacitor element relative to the first capacitor element, wherein at least a part of the first capacitor element and/or the second capacitor element forms at least a part of the guide device so as to contribute to guiding the movement.

* * * * *